(12) United States Patent
Kwak et al.

(10) Patent No.: US 12,126,512 B2
(45) Date of Patent: Oct. 22, 2024

(54) SYSTEM AND METHOD FOR MONITORING NETWORK SERVICE ACCESSIBILITY BASED ON NETWORK TRAFFIC DATA AND SOCIAL MEDIA DATA

(71) Applicant: Royal Bank of Canada, Toronto (CA)

(72) Inventors: Christine Kwak, Toronto (CA); Marat Khandros, New York, NY (US); AmirReza Oghbaee, New York, NY (US); Anika Prova, Toronto (CA); Elodie Kane, Toronto (CA); Parth Miglani, Brampton (CA); Shivam Nagpal, Toronto (CA)

(73) Assignee: Royal Bank of Canada, Toronto (CA)

( * ) Notice: Subject to any disclaimer, the term of this patent is extended or adjusted under 35 U.S.C. 154(b) by 0 days.

(21) Appl. No.: 18/233,446

(22) Filed: Aug. 14, 2023

(65) Prior Publication Data
US 2024/0073116 A1  Feb. 29, 2024

Related U.S. Application Data

(60) Provisional application No. 63/400,524, filed on Aug. 24, 2022.

(51) Int. Cl.
*H04L 43/0876* (2022.01)
*H04L 43/091* (2022.01)

(52) U.S. Cl.
CPC ........ *H04L 43/0876* (2013.01); *H04L 43/091* (2022.05)

(58) Field of Classification Search
None
See application file for complete search history.

(56) References Cited

U.S. PATENT DOCUMENTS 10,270,668 B1 *  4/2019  Thompson .............. H04L 41/16
11,367,034 B2 *  6/2022  Chintalapati ......... G06T 11/206
(Continued)

*Primary Examiner* — June Sison

(57) ABSTRACT

A method for monitoring a network service based on a correlation including network traffic metrics experienced by the network service and infrastructure operational metrics of the network service, the method comprising the steps of: obtaining periodic data including the network traffic metrics, the infrastructure operational metrics, and social media metrics, the social media metrics including content associated with one or more services provided by the network service; storing the network traffic metrics, the infrastructure operational metrics, and social media metrics in a storage for use as historical data representing a predefined period of time; providing a correlation defining a relationship between metrics content of the periodic data; receiving the periodic data during operation of the network service and using the correlation to process the received periodic data to determine an output representing an infrastructure operational metric; comparing the infrastructure operational metric to a predefined operational constraint; generating an alert notification when the infrastructure operational metric contradicts the predefined operational constraint; and sending at least one of the infrastructure operational metric and the alert notification to a support system for subsequent processing.

20 Claims, 8 Drawing Sheets

(56) References Cited

U.S. PATENT DOCUMENTS

| | | | |
|---|---|---|---|
| 2012/0209918 A1* | 8/2012 | Shah | G06Q 30/0251 |
| | | | 709/205 |
| 2014/0207562 A1* | 7/2014 | Gupta | G06Q 50/01 |
| | | | 705/14.41 |
| 2020/0351201 A1* | 11/2020 | Li | G06F 11/3006 |
| 2023/0273822 A1* | 8/2023 | Ortiz | G06F 9/5061 |
| | | | 718/104 |

* cited by examiner

SYSTEM AND METHOD FOR MONITORING NETWORK SERVICE ACCESSIBILITY BASED ON NETWORK TRAFFIC DATA AND SOCIAL MEDIA DATA

TECHNICAL FIELD

The present disclosure is directed at methods, systems, and techniques for monitoring network services.

BACKGROUND

In January 2021, users from a Reddit group initiated a "short squeeze" on GameStop's stock, which resulted in a flood of user traffic onto many investing platforms. In line with that, institutions had previously implemented that an ample amount of headroom for network traffic could be a decided multiple (e.g. 2 times the highest volume day). Unfortunately, many financial institutions were facing an overload of trades the day the GameStop short squeeze started, which was equivalent to many multiples of the largest known trade day in the past for the particular institutions. As a result, many institution's investing platforms went down due to the unexpected network traffic due to artificially inflated trade volumes, for example due to a lack of capacity and repurposed other physical servers.

This had several consequences, as not only did selected institutions lose revenue from commission fees, but it also resulted in a damaged reputation, losing both current and potential new users. Many clients expressed their frustration on social media (websites like Reddit and Twitter) about the loss of availability of the investment platforms. Some also claimed to move to other competing financial institutions. Furthermore, since some institutions were not prepared for this spike in network traffic, other physical servers had to be repurposed to begin catering to this mass increase in user traffic.

Hence, it is recognised that a very real problem in the industry is how the industry might we use SRE best practices to get insights into stresses that occur on networked investment services as a result of unexpected market fluctuations in alignment to the entire tech stack. As such, what is needed is a network system that facilitates a select user group to achieve their personal goals (e.g. financial) while maintaining access to subscribed network services of the network system.

SUMMARY

An object of the present invention is to provide a system and/or method of network service accessibility monitoring to obviate or mitigate at least one of the above-presented disadvantages of the state of the art.

According to a first aspect, there is provided a method for monitoring a network service based on a correlation including network traffic metrics experienced by the network service and infrastructure operational metrics of the network service, the method comprising the steps of: obtaining periodic data including the network traffic metrics, the infrastructure operational metrics, and social media metrics, the social media metrics including content associated with one or more services provided by the network service; storing the network traffic metrics, the infrastructure operational metrics, and social media metrics in a storage for use as historical data representing a predefined period of time; providing the correlation defining a relationship between metrics content of the periodic data; receiving further periodic data during operation of the network service and using the correlation to process the received further periodic data to determine an output representing an infrastructure operational metric; comparing the infrastructure operational metric to a predefined operational constraint; generating an alert notification when the infrastructure operational metric contradicts the operational constraint; and sending at least one of the infrastructure operational metric and the alert notification over the communications network for subsequent processing.

A further aspect provided is a computer system for monitoring a network service based on a correlation including network traffic metrics experienced by the network service and infrastructure operational metrics of the network service provided on a communications network, the computer system comprising: a set of instructions stored on a computer readable medium for causing one or more computer processors to: obtain periodic data including the network traffic metrics, the infrastructure operational metrics, and social media metrics, the social media metrics including content associated with one or more services provided by the network service; store the network traffic metrics, the infrastructure operational metrics, and social media metrics in a storage for use as historical data representing a predefined period of time; provide the correlation defining a relationship between metrics content of the periodic data; receive further periodic data during operation of the network service and using the correlation to process the received further periodic data to determine an output representing an infrastructure operational metric; compare the infrastructure operational metric to a predefined operational constraint; generate an alert notification when the infrastructure operational metric contradicts the predefined operational constraint; and send at least one of the infrastructure operational metric and the alert notification over the communications network for subsequent processing.

A further aspect provided is a computer readable media having stored instructions thereon for execution by a computer processor for monitoring a network service based on a correlation including network traffic metrics experienced by the network service and infrastructure operational metrics of the network service provided on a communications network, the computer readable media having the executable instructions for causing one or more of the computer processors to: obtain periodic data including the network traffic metrics, the infrastructure operational metrics, and social media metrics, the social media metrics including content associated with one or more services provided by the network service; store the network traffic metrics, the infrastructure operational metrics, and social media metrics in a storage for use as historical data representing a predefined period of time; provide the correlation defining a relationship between metrics content of the periodic data; receive further periodic data during operation of the network service and using the correlation to process the received further periodic data to determine an output representing an infrastructure operational metric; compare the infrastructure operational metric to a predefined operational constraint; generate an alert notification when the infrastructure operational metric contradicts the predefined operational constraint; and send at least one of the infrastructure operational metric and the alert notification over the communications network for subsequent processing.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

In at least some embodiments herein, methods, systems, and techniques for generating and updating a user profile 101.

Figure 1:
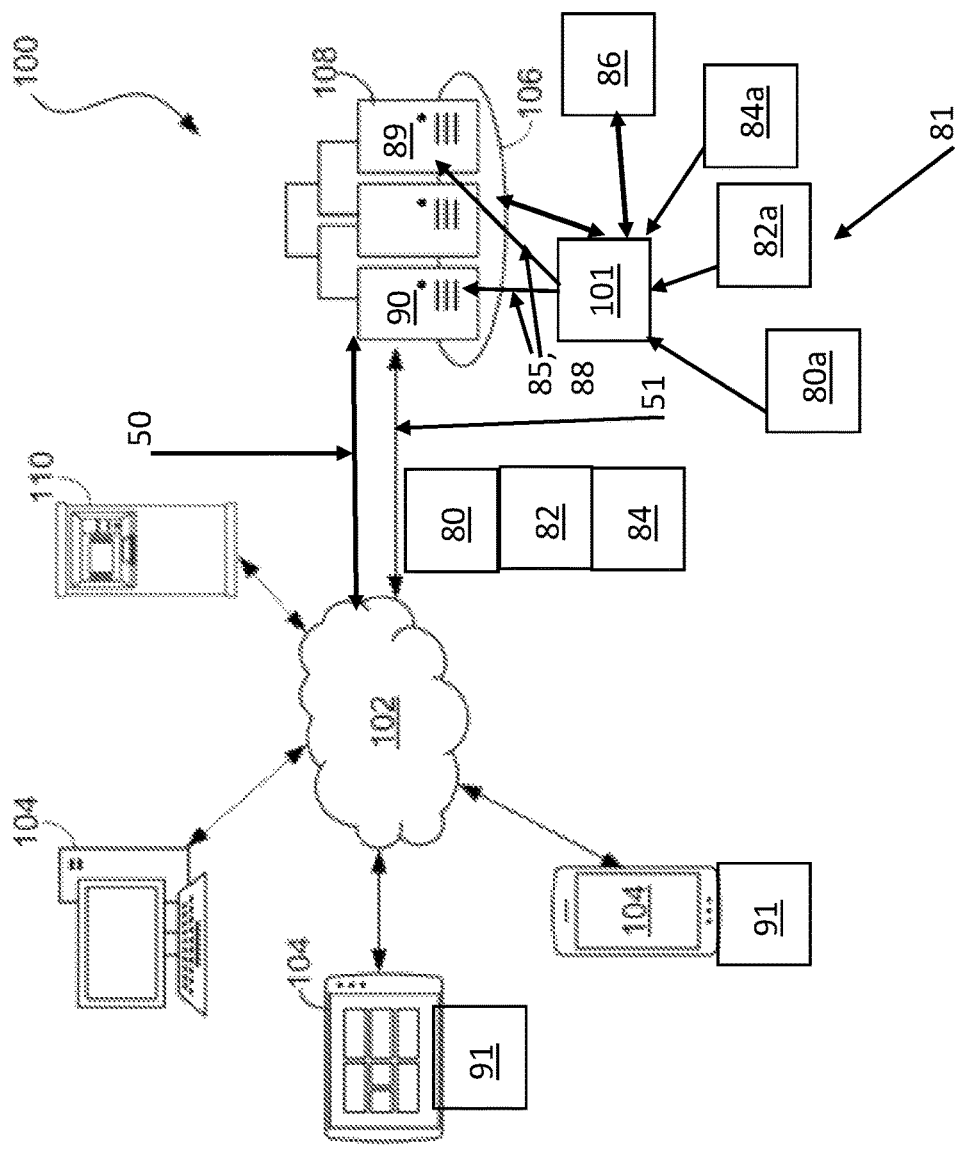
FIG. 1 shows an example system diagram of a monitoring system for a network service based on live data feeds.

Referring now to FIG. 1, there is shown a computer network system 100 that comprises an example embodiment for predicting network traffic loads 51 on a network service 90. It is recognised that periodic unexpected increases/fluctuations in the network traffic loads 51 on the network service 90 could affect the operational performance of the network service 90, including interruption of user accessibility, interruption of service operation, etc. More particularly, the computer network system 100 comprises a wide area network 102 such as the Internet to which various user devices 104 (for example a mobile device), an ATM 110, and data center 106 are communicatively coupled. The data center 106 comprises a number of servers 108 networked together to collectively perform various computing functions. For example, in the context of a financial institution such as a bank (one example of an institution), the data center 106 may host online banking services 90 that facilitates users to log in to those servers 108 using user accounts that give them access to the various computer-implemented banking services 90 such as online fund transfers, investment platforms, real-time trades, etc. For example, the service 90 can be accessed via the network 102 using a client—server model, e.g. an application 91 executed on the user device 104 that communicates with the network service 90 hosted on one or more of the servers 108. As such, it is recognised that an investment platform is just one example embodiment of the network service 90.

In general, a network service 90 can be refer to a software application provided in computer networking (e.g. via the network 102). Network services 90 are applications at the network 102 application layer that connect users working in offices, branches, or remote locations to applications and data available in the network 102. These services 90 run on servers 108. A network 102 is an interconnection of computers 104, 108 that share resources. The network 102 can be made up of interconnected client 104 and server 108 computers. These networks 102 provide certain services 90 vital to the normal flow of information on the internet. The network services 90 can be thought of as operands in the network 102 provided by server(s) 108 requested by the client computers 104.

Therefore, a network service 90 as one embodiment is an application running at a network application layer (of the network 102) and above, such that the network service 90 provides data storage, manipulation, presentation, communication or other capabilities which can be implemented using a client-server or peer-to-peer architecture based on application layer network protocols (e.g. communication between client devices 104 and one or more servers 108 hosting the network service 90). Each network service 90 can be provided by a server component running on one or more computers 108 (often a dedicated server computer 108 offering multiple services 90) and accessed via a network 102 by client components running on other devices 104. However, the client and server components can both be run on the same machine, if desired. Clients 104 and servers 108 can have a user interface (e.g. GUI), and sometimes other hardware associated with the device 104, 108 shared or otherwise dedicated to the service 90 and the network 102 interaction therewith. Examples of network services 90 can include services 90 such as but not limited to: Directory services; e-Mail; File sharing; Instant messaging; Online game; Printing; File server; Voice over IP; Video on demand; Video telephony; World Wide Web; Simple Network Management Protocol; Time service; and/or Wireless sensor network.

The data center 106 (organizing the operation of the server(s) 108) can monitor the network traffic loads 51 using a monitoring service 101 based on a number of criteria, including data feeds 50 of a real-time computer infrastructure utilization 80 (e.g. CPU utilization, memory usage, network throughput, bandwidth usage, etc.) of the servers 108 of the data center 106, a real-time measured traffic load quantity 82 (e.g. transactions per second (TPS) or other predefined unit of time) of the network traffic 51, and a real-time social media usage measurement 84 (e.g. occurrence of selected one or more keywords present in network messaging produced by the social media platform(s)/websites 103 (e.g. Facebook™, Twitter™, etc.) based on third party monitoring 105 (or other metrics provided directly from the platform(s) 103) of social media network(s) messaging). The data feeds 50 can be obtained from network sources 103, 105) external to the data center 106 over the network 102 (e.g. social media reporting services 103, 105) and/or can be obtained from local sources (also not shown) such as operating systems or other systems reporting operational data of the server(s) 108. Further, the monitoring service 101 can have access to stored historical values for the quantities 80a, 82a, 84a for a selected period of time (e.g. a rotating window of the last 30 days of service 90 operation), which can be updated over time using the received data feeds 50.

Social media platforms 103 can be used to define a collective term for websites and applications (implemented on servers 108 connected to the network 102) that focus on communication, community-based input, interaction, content-sharing and collaboration. People via client devices 104 use social media platforms 103 to stay in touch and interact with friends, family and various communities via social media messaging/content distributed on the network 102. Businesses can use social applications 103 to market and promote their products and track customer concerns. Business-to-consumer websites include social media components 103, such as comment fields for users. Various tools help businesses track, measure and analyze the attention the company gets from social media components 103, including brand perception and customer insight. As such, a social media platform 103 can also be referred to as a social media component 103 of a server 108 that may be hosting network applications (e.g. financial institution products) other than those directed to solely social media messaging. It is recognized that social media 103 facilitates the sharing of ideas and information through virtual networks 102, which facilitate user devices 104 to share content, interact online, and build communities.

It is recognized that the monitoring service 101 uses the received data feeds 50 (either synchronously or asynchronously) to keep updated on the amount and type of social media content that is generated and distributed on the network 102.

As a result of the monitoring by the monitoring service 101, based on a comparison by a comparator 83 (see FIG. 3) to predefined network traffic limits 86 (including a correlation function 87), as further defied below, the monitoring service 101 can send periodic notifications 88 representative of predicted/expected network traffic loads 51 (e.g. in the future, real-time, etc., as desired/configured) to a network administrator 89 for presentation on a user interface 212 (see FIG. 2) associated with the datacenter 106 and/or can send the notification 88 as an automated command (e.g. pre-defined and thus mapped to a set traffic load 51) to control or otherwise inform supplemental systems 89 (e.g. a system administrator and/or set of backup servers to be employed in event of determination that the capacity of the servers 108 currently attributed to the service 90 will be/are exceeded based on the output of the comparator 83, etc.).

It is also recognised that the alerts 88 can be sent out when real-time (rather than predicted) infrastructure metrics 80 (e.g. real-time CPU usage) is out of a specified range 86, and/or the Pearson r (correlation coefficient) between metrics 80, 82, 84 is out of range 86, such that these ranges 86 can be referred to as pre-defined values. In other words, the monitoring service 101 can be used to generate automated alerts 88 when using calculated predicted values or with calculated real-time values, as desired. As a further embodiment, a result of the monitoring by the monitoring service 101, based on a comparison by a comparator 83 (see FIG. 3) to predefined network traffic limits 86 (including a correlation function 87), as further defied below, the monitoring service 101 can send periodic notifications 88 representative of real-time network traffic loads 51 (e.g. currently being experienced by the service 90) to a network administrator 89 for presentation on a user interface 212 (see FIG. 2) associated with the datacenter 106 and/or can send the notification 88 as an automated command to control or otherwise inform supplemental systems 89 (e.g. a system administrator and/or set of backup servers to be employed in event of determination that the capacity of the servers 108 currently attributed to the service 90 will be/are exceeded based on the output of the comparator 83, etc.).

As further discussed below, the service 90, once receiving the generated notification(s) 88, can then implement remedial actions (e.g. for example automated and thus predefined to be implemented based on receipt of a particular command) based on the assessed traffic limits 86, in order to upgrade or otherwise amend infrastructure resources of the servers 108 currently in use by the service 90. For example, the remedial action could be a dynamic allocation of additional server capacity 89 and or automated changes to operational characteristics 89 of the current implementation (or expected future implementation) of the servers 108 (e.g. imposing bandwidth limitations, etc.).

Figure 2:
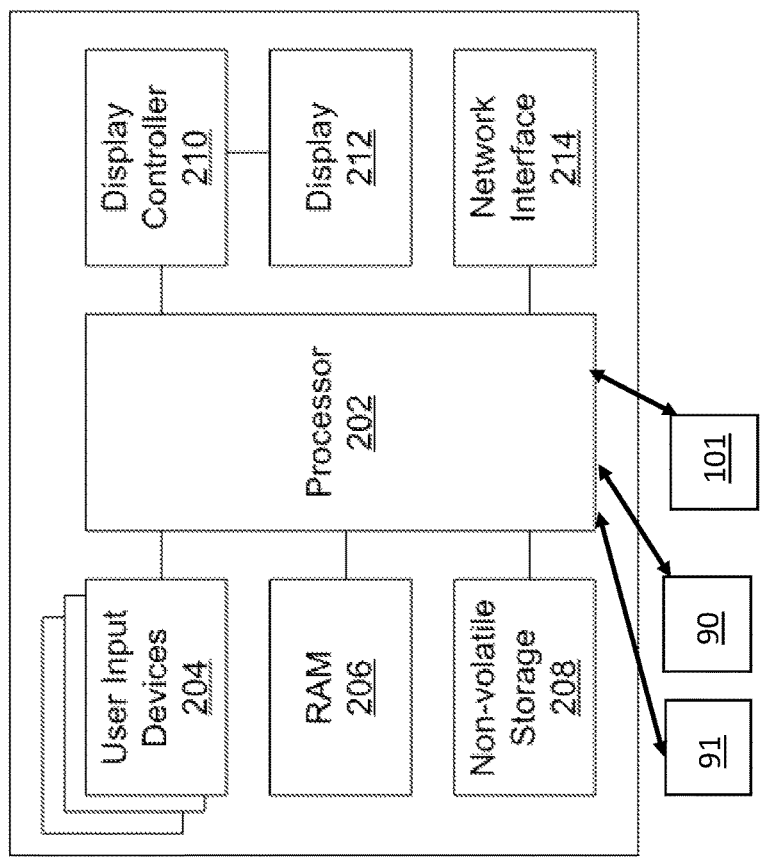
FIG. 2 shows a block diagram of the example computing device of the system of FIG. 1.

Referring now to FIG. 2, there is depicted an example embodiment of one of the servers 108 that comprises the data center 106. The server comprises a processor 202 that controls the server's 108 overall operation. The processor 202 is communicatively coupled to and controls several subsystems. These subsystems comprise user input devices 204, which may comprise, for example, any one or more of a keyboard, mouse, touch screen, voice control; random access memory ("RAM") 206, which stores computer program code (e.g. service 90, 101, user interface 212 such as a dashboard embodied with the application 91) for execution at runtime by the processor 202; non-volatile storage 208, which stores the computer program code executed by the RAM 206 at runtime; a display controller 210, which is communicatively coupled to and controls a display 212; and a network interface 214, which facilitates network communications with the wide area network 102 and the other servers 108 in the data center 106.

The non-volatile storage 208 has stored on it computer program code that is loaded into the RAM 206 at runtime and that is executable by the processor 202. When the computer program code is executed by the processor 202, the processor 202 causes the server 108 to implement a method for implementing the service 90, 101 such as is described in more detail below. Additionally or alternatively, the servers 108 may collectively perform that method using distributed computing. While the system depicted in FIG. 2 is described specifically in respect of one of the servers 108, analogous versions of the system may also be used for the user devices 104.

Figure 3:
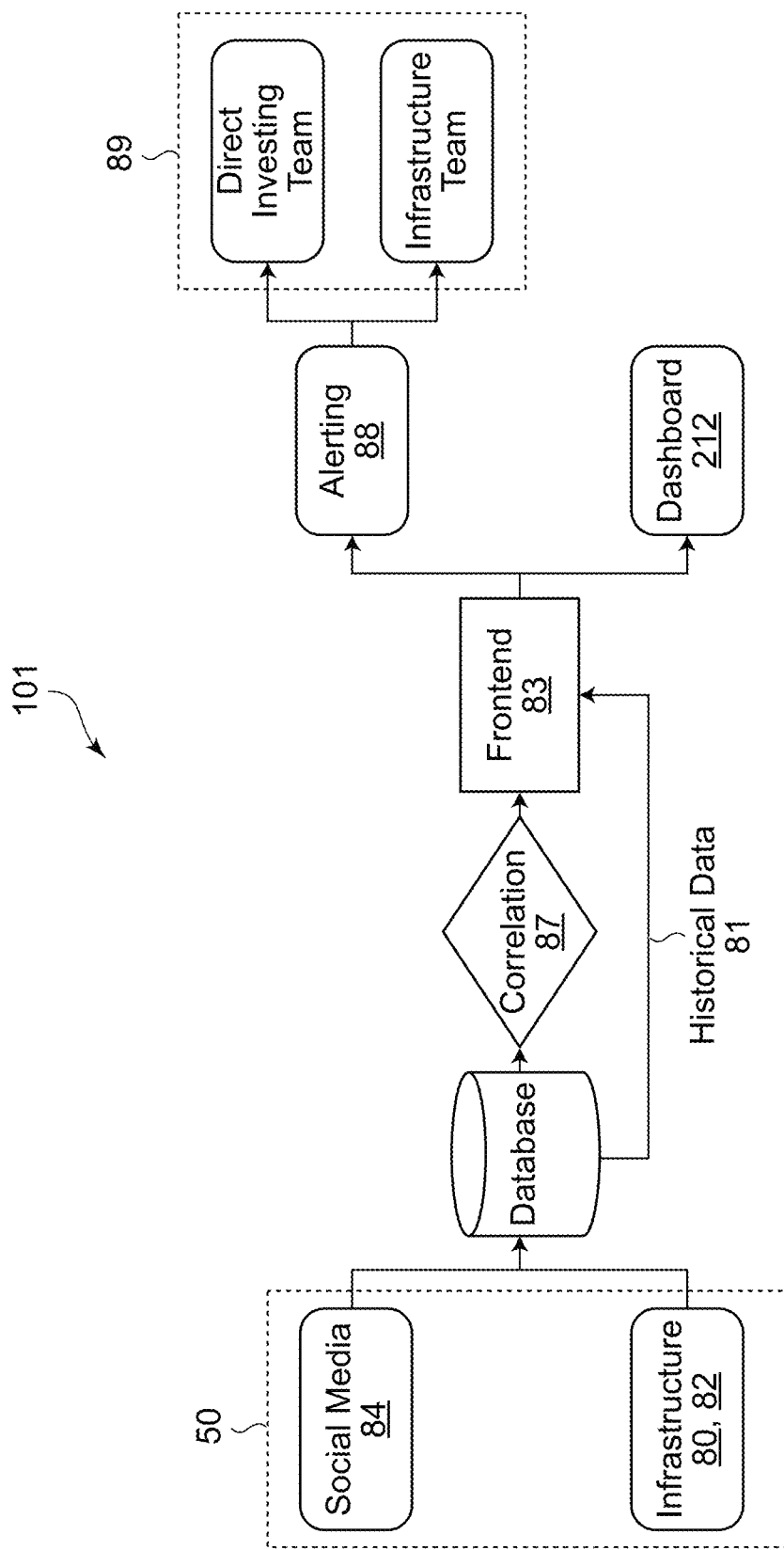
FIG. 3 shows an example configuration of the service of FIG. 1.

Referring to FIGS. 1, 2, 3, the monitoring service 101 can include a number of modules (e.g. software based and/or dedicated hardware configured), including such as but not limited to: a front end comparator 83 for comparing data 81, 50 with help of a predefined correlation 87 (e.g. a mathematical relationship relating the different data 50 to one another) and generating the notifications 88 suitable for display on the user interface 212, for example; a database used to receive the real-time content 50 (e.g. also for presentation on the user interface 212 as an overlay with the historical data 81 and associated notifications 88) and to supply the historical data 81. It is recognised that the real-time data 50 is used to update the historical data window content 81 as the network traffic 51 is received by the service 90.

In view of the above, the monitoring service 101 can include the comparator 83 as a Correlation Engine, operated using the correlation 87 and real-time data feeds 50 in order to deduce real-time correlation outputs between Social Media indicators (e.g. data 84) and network traffic related metrics 82 (e.g. TPS), as well as infrastructure metrics 80 (e.g. CPU usage), to anticipate spikes and alert (e.g. teams) via generated notifications 88, and optionally let teams 89 analyze (e.g. future) operational scenarios of the service 90. In view of the above, the monitoring service 101 can include a dashboard as a display 212 of aggregated infrastructure 80, 80a and social media data 84, 84a, including scenario analysis (estimate one metric based one or more other metrics). As such, the generated notifications 88 can be used by the service 90 to alert (e.g. teams) when metrics exceed set thresholds 86, for example.

It is recognised that neither the dashboard, nor the (e.g. slack) alerts would perform any transformation or gathering of data prior to implementation of the system 100 and monitoring and generation of alert messaging. In other words, all the calculations and data acquisition can be performed prior to this stage. For example, the front-end dashboard can simply display the data it is given, and the slack alerts can be just a display of what was sent from the backend.

It is also recognised that the social media indicators 84 can be obtained using platform specific social media APIs to gather social media data. For example, contemplated as alternative embodiments to Brandwatch 105 as a source of the metrics 84 can be such as but not limited to: using Reddit 103 and/or Twitter APIs 103 to collect the data 84.

The monitoring service 101 therefore utilizes infrastructure 80, 80a and social media 84, 84a data, in view of the network traffic data 82, 82a, to provide a shared view of insightful metrics 88 in a single dashboard display 212 (e.g. a react dashboard app that displays aggregated infrastructure and social media data in response to the output of the comparator 83). In terms of the scenario analysis implemented by the comparator 83 (e.g. correlation engine), for example, change in TPS can show what corresponding change is made in other infrastructure metrics like CPU usage of the servers 108 implementing the service 90 during receipt over the network 102 of the real-time traffic 51. This can include the alerts/commands notifications 88 delivered through slack based on metrics crossing certain predefined thresholds 86. For example, a CPU Usage status notification 88 can be generated by the comparator 83 when the CPU usage 80 (real-time and/or predicted) exceeds the associated CPU set limit 86 and then the alert 88 can be sent to (e.g. the team 89, to an automated server 108 operations reconfiguration system, etc.). It is recognised the CPU usage is one example of infrastructure utilization 80 and the CPU set limit 86 is one example of the predefined limits/constraints 86. Further, as described below, the correlation 87 can be embodied, by example, using a correlation coefficient (Pearson r) such that when it falls below or exceeds the regularly observed value, it signifies that one variable is changing more than usual (as exemplified by the historical data 81). Thus, an alert 88 can be generated and sent to monitor the identified unusual change (via application of the correlation with the data 81, 50) using the dashboard display 212.

Example Operation of the Comparator 83 Using the Correlation 83

Further to the above, the monitoring service 101 can use data 50 from Dynatrace 105 (e.g. including infrastructure data 80 such as CPU usage of the server(s) 108, network traffic data 82 such as aggregated transactions per second, etc.) and social media/news data 84 from Brandwatch 105 (which can include the volume of mentions of selected keywords associated with the network service 90 including by example stock market buzz words like "interest rate", "short squeeze", etc. and trending ticker symbols for stocks and other financial instruments provided as part of the network service 90), in order to find a positive correlation between the data 50. For example, the correlation 87 (used by the comparator 83) can be defined by example as a correlation algorithm including calculation of the Pearson correlation coefficient (Pearson r) between datasets 80, 82, 84 (using pandas, scipy, and statsmodel python libraries) along with linear regression to train the correlation models to estimate a quantitative measure of CPU usage (e.g. infrastructure metric 80) based on the corresponding quantitative values of the network traffic metrics and social media metrics 82, 84.

For example, the correlation 87 can include incorporation of a Linear Regression package from scikit learn (a library for machine learning in Python providing a selection of tools for machine learning and statistical modeling including classification, regression, clustering and dimensionality reduction), providing two correlation models with different inputs to estimate CPU usage (e.g. using a statistical model relationship relating infrastructure data 80 with network traffic data 82 and social media data 84). For the first model 87, for example, the inputs included transactions per second (TPS) 82 as the independent variable and CPU usage 80 as the dependent variable. The data 81 fed into the model 87 was collected between June 20 and July 14, at a frequency of every 5 minutes. After training the initial model 87 with the data 81 that estimated CPU usage 80a based on transactions per second 82a, we removed outliers from the training data 81 set to improve the accuracy of the model 87. This helped to marginally reduce the value of mean absolute error and root mean squared error (metrics used to analyze the accuracy of models 87). It is recognised that linear regression was implemented as one example embodiment. It is recognised that the linear regression techniques described could also be replaced/supplemented with other more-in-depth machine learning (ML) models such as XG boosting algorithm, random forest regression, or some form of multi-layered model.

For the second model 87, the inputs included transactions per second 82a and volume of mentions 84a as the independent variables, and CPU usage 80a as the dependent variable. This data 81 was collected between April 1 and July 15 at an hourly frequency, for use as the historical data 81 used to train the correlation model 87. Accordingly, once the correlation 87 is trained using the data 81, the trained correlation 87 can be used in analyze the real-time data 50 collected during operation of the monitoring system 101 in monitoring real-time operational performance of the network service 90. It is also recognized that the continued collection of the real-time data 50 can be stored as the historical data 81 for a predefined window (e.g. period of time such as 30 days), such that the contents of the historical data 81 are continually updated using the data 50. Further, it is recognised that the correlation 87 can be periodically retrained using the updated versions of the historical data 81, in order to better adapt/improve the analysis performed by the correlator 83 over time.

It is recognised that updated training of the correlation 87 using the updated historical data 81 can be done on a periodic basis, such that the current in use correlation 87 can be substituted or otherwise amended by the retrained correlation 87. For example, the retraining of the correlation 87 can be performed due to a situation encountered whereby the present correlation 87 did not adequately predict the expected/desired operational performance (e.g. performance of the network service 90 falling below a set performance threshold) of the network service 90.

Figure 4:
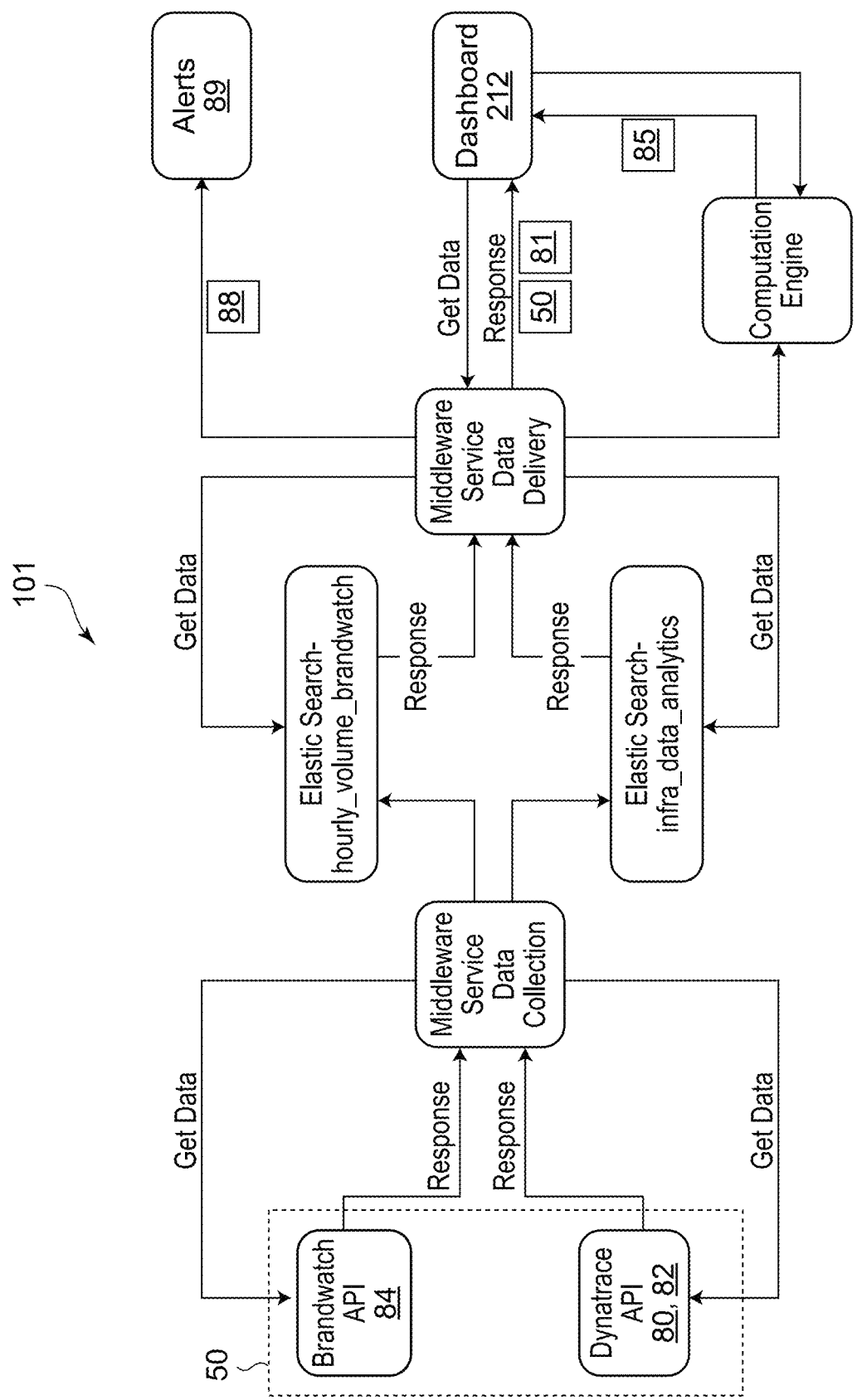
FIG. 4 shows an example process flow of the service of FIG. 3.
Figure 5:
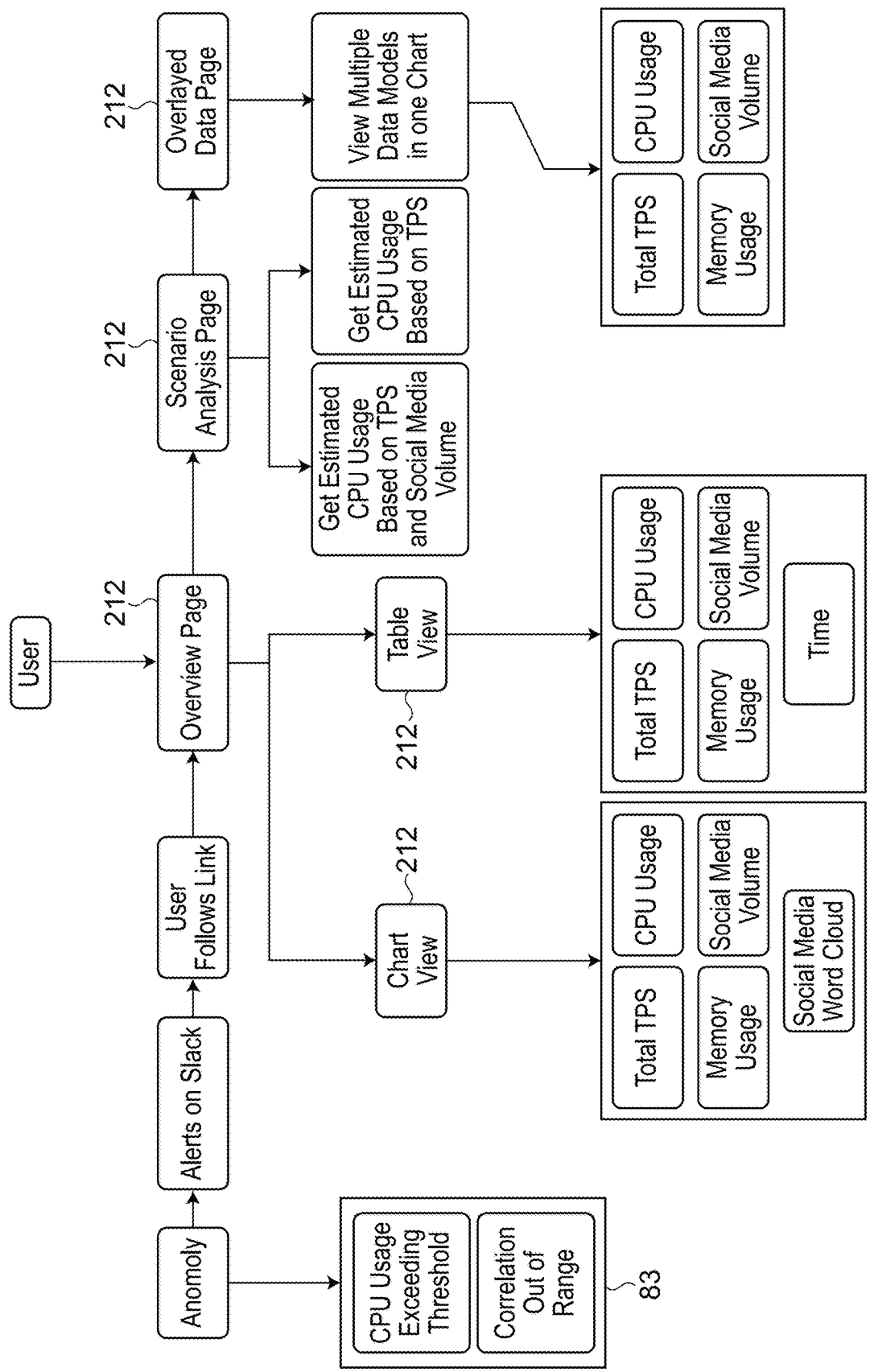
FIG. 5 shows an overview of the process of FIG. 4.

Referring to FIG. 4, shown is an operational block diagram of the data 50 of the monitoring system 101, showing collection sources used and search engines 102 (e.g. elastic search) used to parse the data 50 (in particular the social media data 84) for selected mention of keywords and phrases associated with the operational aspects of the service 90 (e.g. mention of known/named financial instruments offered by the service 90—e.g. particular stocks traded on an investment platform). Referring to FIG. 5, shown are example display 212 outputs of the results of the comparator 83.

Figure 7:
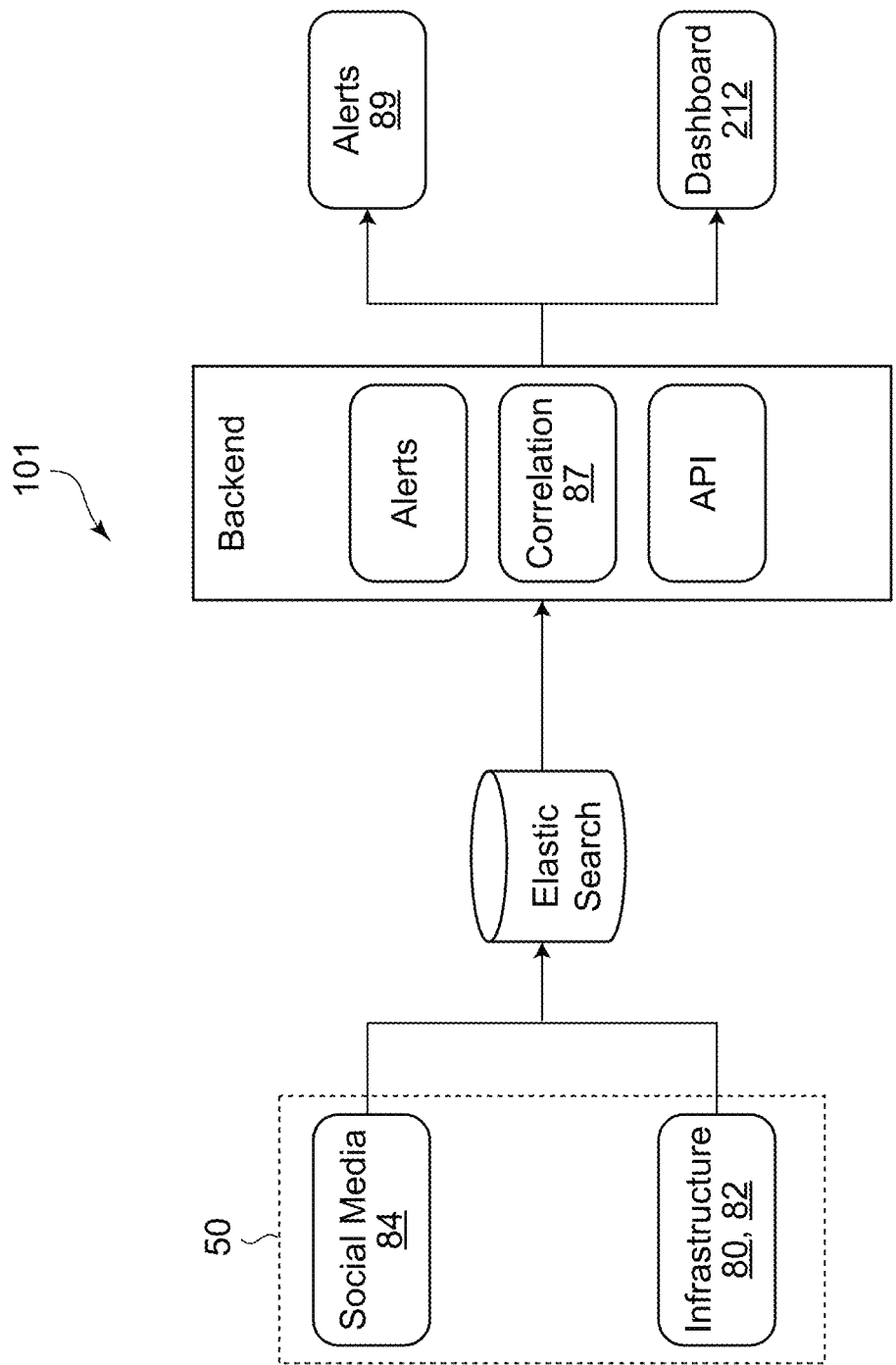
FIG. 7 is an alternative embodiment of the system of FIG. 1.
Figure 8:
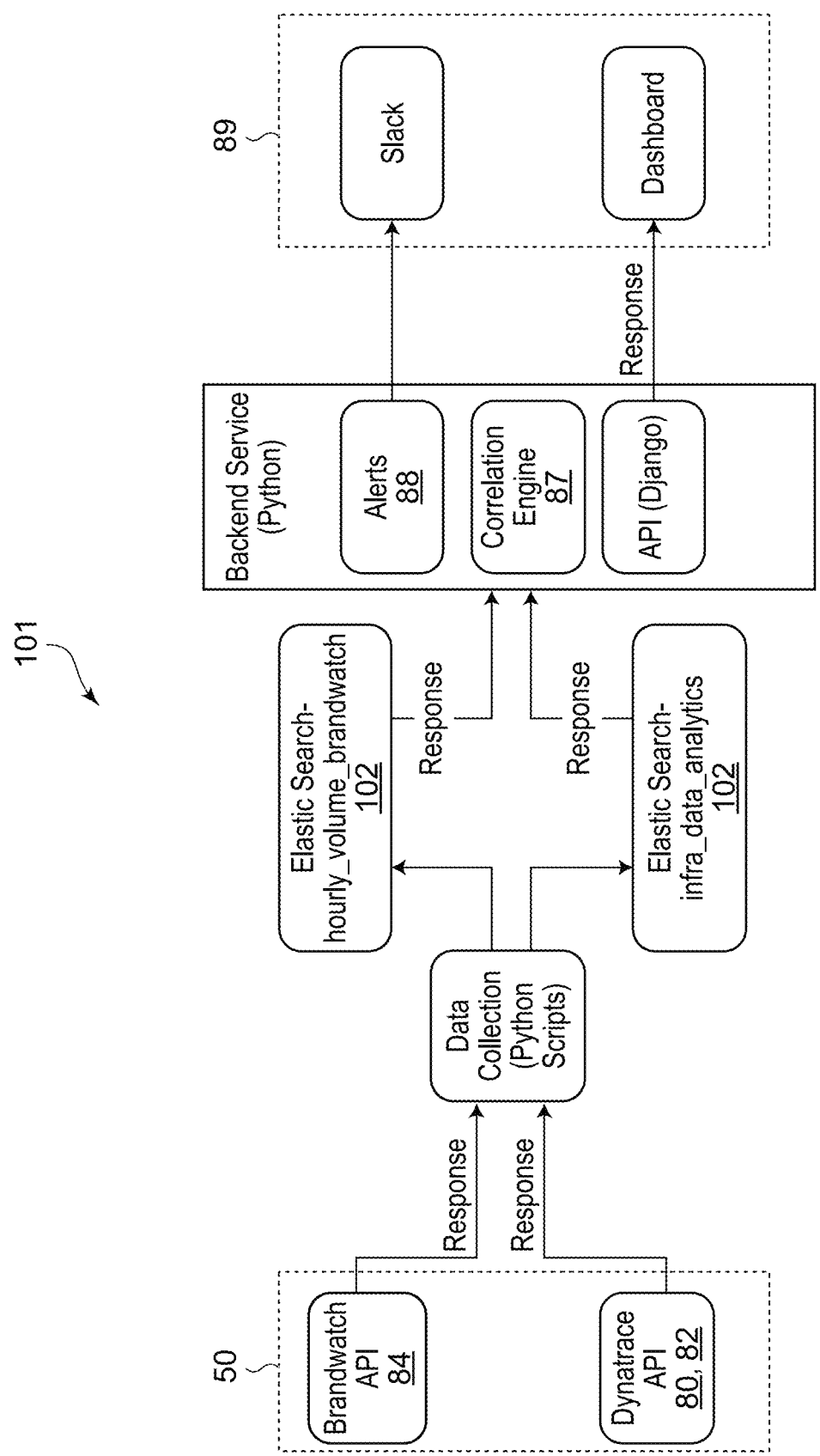
FIG. 8 is a further alternative embodiment of the system of FIG. 1.

Further, FIGS. 7, 8 show alternative embodiments of the diagrams of the architecture of the system of FIG. 1. Some differences include the calculation of alerts 88 and correlation 87 encompassed within the backend, as well as the front-end dashboard coming directly from the API in Django.

Figure 6:
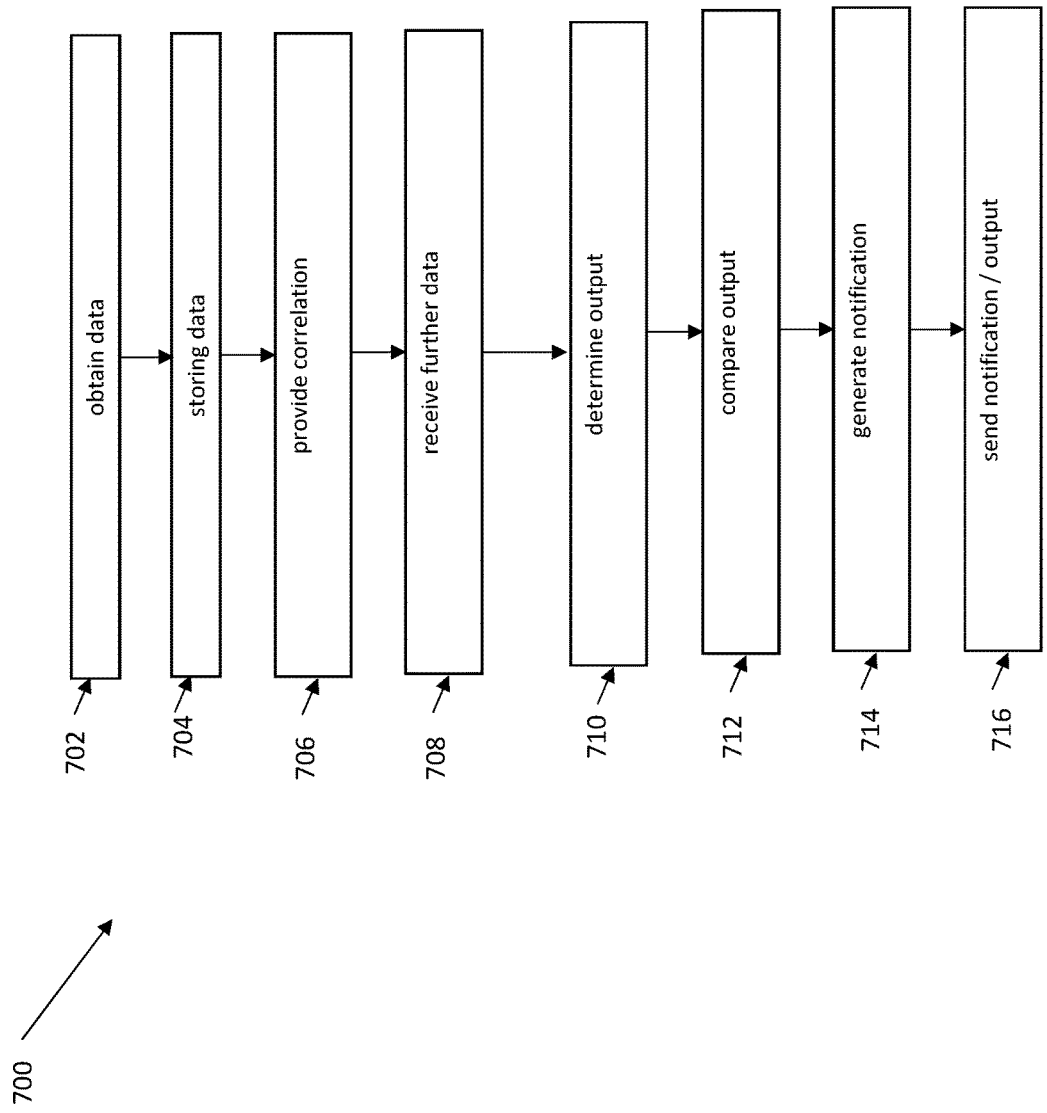
FIG. 6 shows example user interface content of the service of FIG. 3.

Referring to FIG. 6, shown is an example operation 700 of the monitoring system 101 (of FIG. 1) for generating the results 88 of the comparator 83 when operating the correlation 87 using the data 50, 81 as dependent/independent input/output variables. For example, the monitoring 700 of the network service 101 can be based on a correlation 87 including network traffic metrics 82a experienced by the network service 90 and infrastructure operational metrics 80a of the network service 90, the method comprising the steps of: obtaining 702 periodic (e.g. real-time) data 50 including the network traffic metrics 82, the infrastructure operational metrics 80, and social media metrics 84, the social media metrics 84 including content associated with one or more services provided by the network service 90; storing 704 the data 50 as network traffic metrics 82a, the infrastructure operational metrics 80a, and social media metrics 84a in a storage for use as historical data 81 representing a predefined period of time (e.g. a window of 30 days); providing 706 the correlation 87 defining a relationship between metrics content of the periodic data 50; receiving 708 further periodic data 50 during operation of the network service 90 and using 710 the correlation 87 to process the received further periodic data 50 to determine an output 85 representing an infrastructure operational metric 85; comparing 712 the infrastructure operational metric 85 to a predefined operational constraint 86; generating 714 an alert notification 88 when the infrastructure operational metric 85 contradicts the predefined operational constraint 86; and sending 716 at least one of the infrastructure operational metric 85 and the alert notification 88 to a support system 89 for subsequent processing.

In view of the above, the monitoring system 101 provides a (e.g. positive) correlation between the data 50 when using a defined correlation 87 (e.g. statistical algorithm) with the data 80, 80a, 82, 82a, 84, 84a, such as a trained and tested linear regression model 87 that estimates/calculates (e.g. real-time, future) future infrastructure usage 80 (e.g. CPU usage) of the server(s) 108 of the data centre 106 based on, example:

1. Transactions per second (TPS) as an example of network traffic metrics 82; and
2. CPU usage as an example of infrastructure metrics 80;
3. Social Media Mentions Volume (e.g. tracked keyword/phrase occurrence) as an example of social media metrics 84.

Further, it is recognised that the social media data 84, 84a can be augmented or otherwise combined with other service external data (e.g. financial data), such as but not limited to: real-time stock market metrics, real-time shorting interest ratio, trading volume, earning call publications, feds announcements.

As such, given the above, it is recognised that there are no other existing marketplace products that do what the monitoring system 101 does, as described by example. There are existing tools like Dynatrace for infrastructure data and Brandwatch for social media data. However, there is an unexpected advantage provide by the monitoring system 101 when combining the metrics 80, 82, 84, 80a, 82a, 84a though the correlation engine, dashboard/user interface 212, and further sending out the alerts 88 (e.g. as displayed messages and/or as automated commands).

The processor used in the foregoing embodiments may comprise, for example, a processing unit (such as a processor, microprocessor, or programmable logic controller) or a microcontroller (which comprises both a processing unit and a non-transitory computer readable medium). Examples of computer readable media that are non-transitory include disc-based media such as CD-ROMs and DVDs, magnetic media such as hard drives and other forms of magnetic disk storage, semiconductor based media such as flash media, random access memory (including DRAM and SRAM), and read only memory. As an alternative to an implementation that relies on processor-executed computer program code, a hardware-based implementation may be used. For example, an application-specific integrated circuit (ASIC), field programmable gate array (FPGA), system-on-a-chip (SoC), or other suitable type of hardware implementation may be used as an alternative to or to supplement an implementation that relies primarily on a processor executing computer program code stored on a computer medium.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise (e.g., a reference in the claims to "a challenge" or "the challenge" does not exclude embodiments in which multiple challenges are used). It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

It is contemplated that any part of any aspect or embodiment discussed in this specification can be implemented or combined with any part of any other aspect or embodiment discussed in this specification. The scope of the claims should not be limited by the embodiments set forth in the above examples, but should be given the broadest interpretation consistent with the description as a whole. It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A method for monitoring a network service application based on a correlation including network traffic metrics experienced by the network service application and infrastructure operational metrics of the network service application provided on a communications network, the method comprising the steps of:
receiving and sending of network traffic data between a plurality of client devices and one or more servers hosting the network service application, the network traffic data being in relation to one or more network services provided by the network service application;
obtaining periodic data including the network traffic metrics, the infrastructure operational metrics, and social media metrics, the social media metrics including social media indicators associated with the one or more network services provided by the network service application;
storing the network traffic metrics, the infrastructure operational metrics, and social media metrics in a storage for use as historical data representing a predefined period of time;
providing the correlation defining a relationship between metrics content of the periodic data;
receiving further periodic data during operation of the network service application and using the correlation to process the received further periodic data to determine an output representing an infrastructure operational metric;
comparing the infrastructure operational metric to a predefined operational constraint;
generating an alert notification when the infrastructure operational metric contradicts the predefined operational constraint; and
sending at least one of the infrastructure operational metric and the alert notification over the communications network for subsequent processing to affect the operational performance of the network service application pertaining to subsequent communication of the network traffic data.

2. The method of claim 1, wherein the network traffic metrics include transactions per predefined period of time for the network traffic data directed to the network service application over the communications network.

3. The method of claim 1, wherein the infrastructure operational metric is CPU usage of a server used to implement the network service application on the communications network.

4. The method of claim 1, wherein the correlation is a statistical model defining a positive correlation between the network traffic metrics, the infrastructure operational metrics, and social media metrics.

5. The method of claim 1, wherein the social media indicators of the social media metrics includes keywords associated with the one or more services provided by the network service application.

6. The method of claim 1, wherein the determined infrastructure operational metric is a predicted quantity.

7. The method of claim 1, wherein the determined infrastructure operational metric is a real-time quantity.

8. The method of claim 1, wherein the network service application is provided by a financial institution.

9. The method of claim 1 further comprising obtaining the social media metrics directly from the network service application using a social media component of the network service application.

10. The method of claim 1 further comprising obtaining the social media metrics directly from a social media platform.

11. The method of claim 1 further comprising updating the metrics content of the historical data and regenerating the correlation based on an updated version of the historical data.

12. The method of claim 11 further comprising implementing said updating based on receipt of the alert notification.

13. The method of claim 11 further comprising implementing said updating based on a selected period of time using the received data feeds.

14. The method of claim 13, wherein the selected period of time is a rotating window of predetermined past period of time of network service application operation.

15. The method of claim 1, the social media indicators of the social media metrics include one or more keywords or phrases associated with the network service application.

16. The method of claim 1, wherein a monitoring service associated with the network service application generates the alert notification.

17. The method of claim 16, wherein the further periodic data is received by the monitoring service as a data feed over the communications network.

18. The method of claim 17, wherein the data feed is received synchronously.

19. A computer system for monitoring a network service application based on a correlation including network traffic metrics experienced by the network service application and infrastructure operational metrics of the network service application provided on a communications network, the computer system comprising:
a set of instructions stored on a computer readable medium for causing one or more computer processors to:
receive and send network traffic data between a plurality of client devices and one or more servers hosting the network service application, the network traffic data being in relation to one or more network services provided by the network service application;
obtain periodic data including the network traffic metrics, the infrastructure operational metrics, and social media metrics, the social media metrics including social media indicators associated with one or more network services provided by the network service application;
store the network traffic metrics, the infrastructure operational metrics, and social media metrics in a storage for use as historical data representing a predefined period of time;
provide the correlation defining a relationship between metrics content of the periodic data;

receive further periodic data during operation of the network service application and using the correlation to process the received further periodic data to determine an output representing an infrastructure operational metric;

compare the infrastructure operational metric to a predefined operational constraint;

generate an alert notification when the infrastructure operational metric contradicts the predefined operational constraint; and send at least one of the infrastructure operational metric and the alert notification over the communications network for subsequent processing to affect the operational state of the network service application pertaining to subsequent communication of the network traffic data.

20. A non-transitory computer readable media having stored instructions thereon for execution by a computer processor for monitoring a network service application based on a correlation including network traffic metrics experienced by the network service application and infrastructure operational metrics of the network service application provided on a communications network, the computer readable media having the executable instructions for causing one or more of the computer processors to:

receive and send network traffic data between a plurality of client devices and one or more servers hosting the network service application, the network traffic data being in relation to one or more network services provided by the network service application;

obtain periodic data including the network traffic metrics, the infrastructure operational metrics, and social media metrics, the social media metrics including social media indicators associated with one or more network services provided by the network service application;

store the network traffic metrics, the infrastructure operational metrics, and social media metrics in a storage for use as historical data representing a predefined period of time;

provide the correlation defining a relationship between metrics content of the periodic data;

receive further periodic data during operation of the network service application and using the correlation to process the received further periodic data to determine an output representing an infrastructure operational metric;

compare the infrastructure operational metric to a predefined operational constraint;

generate an alert notification when the infrastructure operational metric contradicts the predefined operational constraint; and send at least one of the infrastructure operational metric and the alert notification over the communications network for subsequent processing to affect the operational state of the network service application pertaining to subsequent communication of the network traffic data.

* * * * *